Nov. 3, 1925.
S. E. HOLLAND
TOOL JOINT
Filed Aug. 29, 1924
1,559,874
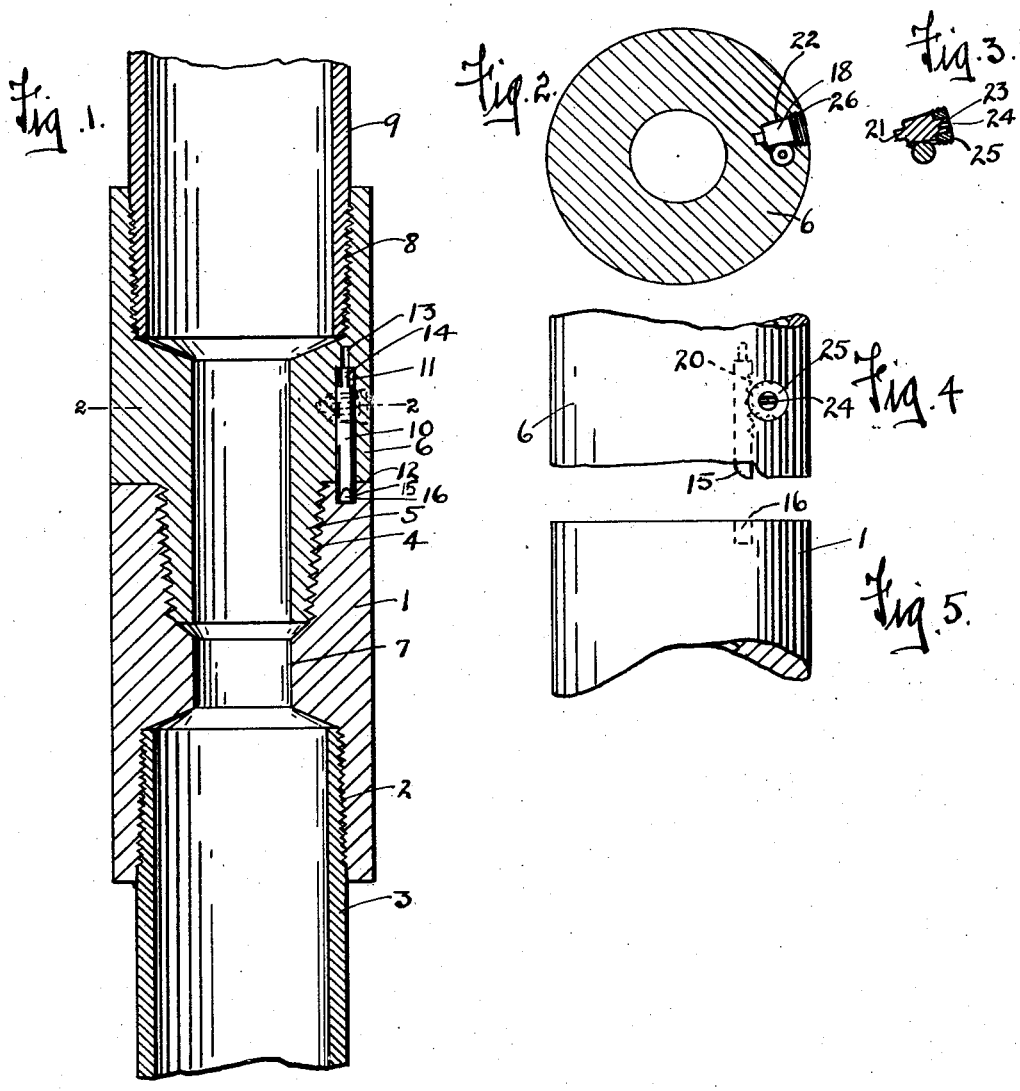
SAMUEL E. HOLLAND, Inventor
By Jesse R. Stone
his Attorney Patented Nov. 3, 1925.

1,559,874

UNITED STATES PATENT OFFICE.

SAMUEL E. HOLLAND, OF CORSICANA, TEXAS.

TOOL JOINT.

Application filed August 29, 1924. Serial No. 734,862.

*To all whom it may concern:*

Be it known that I, SAMUEL E. HOLLAND, a citizen of the United States, residing at Corsicana, Navarro County, Texas, have invented a certain new and useful Improvement in Tool Joints, of which the following is a specification.

My invention relates to an improvement in tool joints such as are employed in the rotary system of drilling. In drilling by the rotary method, the drill is secured at the lower end of a drill stem composed of lengths of tubular drill pipe, connected together by couplings throughout its length. At the joints in the pipe where it is desired to unscrew the same, on going into or out of the well with the drill bit, are placed tool joints acting as coupling members; such joints are made of hardened steel, and the threaded portion is tapered and has thereon a coarse thread which will easily engage and disengage when the joints are to be screwed up or unscrewed in the operations of inserting the drill into the well, or withdrawing it therefrom.

It is an object of the invention to provide upon the engaging parts of a tool joint a locking means for securing the parts of the tool joint against rotation while the drill stem is being rotated, thus guarding against the uncoupling of the joint while it is in the hole.

It is another object to provide a locking means for preventing the uncoupling of the joint which may be readily disengaged when it is necessary to uncouple the joint.

These and other objects and advantages will be shown more clearly in the description which follows:

Referring to the drawing herewith, Fig. 1 is a central longitudinal section through an ordinary type of tool joint showing my improvement thereon. Fig. 2 is a transverse section on the line 2—2 of Fig. 1. Fig. 3 is a transverse section through the locking means employed. Fig. 4 is a broken side elevation of the pin member of a tool joint with my locking means thereon, and Fig. 5 is a similar broken side elevation of the box member of the tool joint. Like numerals of reference are employed to designate like parts in all the views.

In the drawing, Fig. 1 illustrates an ordinary type of tool joint in which there is a lower box member 1 threaded at its lower end 2 for engagement with a section of pipe 3. The upper end of the box member is provided with a centrally tapered box 4 threaded for engagement with the lower threaded end 5 of the pin member 6 of the joint.

Both the box member 1, and the pin member 6 of the joint, have a somewhat restricted passage 7 extending therethrough to provide a channel for the flushing water employed in rotary drilling. The pin member 6 of the joint is also threaded internally at its upper end 8 for attachment to an adjacent length of drill stem 9.

It will be noted that the pin member is adapted to engage with the box member on a coarse tapered thread which will allow the parts to be screwed together with a few turns only of the pin member; the parts may therefore be easily disengaged if either of the parts are caused to rotate in the wrong direction while in the hole. To provide against this I contemplate using a cylindrical latch member 10 which I have shown as fitting within a cylindrical recess 11 in the pin member. This recess extends from the lower shoulder 12 of the pin member upwardly for a suitable distance, and the upper end of the recess 11 is reduced in diameter, forming an extension 13, and forming a guide for the upper end 14 of the latching bolt.

The latch bolt is preferably beveled at 15 on the side thereof toward which the joint is rotated when the parts are being screwed together. This will allow the parts to be more easily engaged, but also tend to prevent rotation in the opposite direction. The box member 1 has a cooperating recess 16 therein, which is adapted to register with the recess 11 in the pin member when the joint is shouldered together. Said recess 16 is adapted to receive the latching bolt 10, as shown in the drawing.

The latching bolt 10 is adapted to be raised out of locking position by means of an operating gear member 18. Said gear member 18 is provided with teeth on the side thereof presented toward the latching bolt, and teeth 20 on one side of said bolt form a rack to engage with the teeth of the gear 18. The said gear 18 is formed upon a rotatable pin 21 fitting within a radial recess 22 in the side of the pin member. The outer periphery of the gear member 18 is tangent to the side of the recess 11 so that the teeth upon the gear member will mesh with the teeth upon the bolt.

As shown in Fig. 3, the reduced outer end of the pin 21 is provided with a transverse notch or groove 24 to receive a screw driver, or similar tool, by means of which the gear may be rotated.

The said reduced end 23 fits within a bearing in a locking nut 25 adapted to screw within the threaded portion 26 at the outer end of the recess 22. Thus the bolt 10 is placed in position in the recess and the pin and gear 18 and 21 are inserted in position with the teeth 19 upon the gear engaging with the rack 20. The bearing cap 25 is then screwed in position to hold the gear within its recess. A screw driver is then used to rotate the gear to withdraw the bolt upwardly within the recess so that the tool joint may be screwed together.

When the tool joint has been properly screwed up tightly, the recess 16 will register with the recess 11, and the gear may be rotated to throw the bolt downwardly into locking engagement with the box member, thus preventing the unscrewing of the device while the device is being operated.

When it becomes necessary to unscrew the tool joint, the bolt may be withdrawn by rotating the gear in the opposite direction, thus making it possible to easily unscrew the tool joint. It will be noted that the locking bolt 10 not only prevents unscrewing of the joint, but also guards against the screwing of the joint too tightly together, as may sometimes occur in drilling. The joint may not then become frozen in such manner as to prevent the unscrewing of the joint when this operation becomes necessary. The bolt therefore is a safety provision against unscrewing of the joint, and also a guard against the locking of the parts too tightly together during the operation of drilling. Further objects and advantages will be apparent to those skilled in the art without further description.

What I claim as new and desire to protect by Letters Patent is:

1. In a tool joint including a pin member and a box member below said pin member, a locking means including a cylindrical bolt, slidable in a recess in the pin member and engaging within a cooperating recess in the box member, a rotatable gear member formed radially in said pin member and having teeth thereon, a rack formed on the side of said bolt cooperating with the teeth on said gear, means to lock said gear removable in position, and means whereby said gear may be rotated.

2. In a tool joint comprising a pin member and a box member below said pin member, a bolt fitting within a recess in said pin member, and a reduced upper end on said bolt fitting within a guide formed in said pin member, a forwardly beveled lower end on said bolt adapted to engage within a recess in said box member when said joint is screwed together, a rack formed on said bolt, and a rotatable gear engaging said rack whereby said bolt may be moved in either direction as desired.

3. In a tool joint including a pin member and a box member below said pin member, a bolt slidable in said pin member, and adapted to engage within a recess in said box member when the tool joint is screwed up, a rack formed on one side of said bolt, a gear member fitting within a radial recess in said pin member and engaging with the teeth on said rack, an outer slotted end to receive a screw driver whereby said gear may be rotated to move said bolt in either direction and a threaded block in said pin member forming a removable bearing for said gear member.

In testimony whereof I hereunto affix my signature this 23 day of August, A. D. 1924.

SAMUEL E. HOLLAND.